United States Patent
Hadi et al.

(10) Patent No.: US 8,859,897 B2
(45) Date of Patent: Oct. 14, 2014

(54) FLEXIBLE BUSBAR

(75) Inventors: Rod Hadi, Troy, MI (US); Jean Claude Fuchs, L'Etrat (FR); Christophe Douzet, Saint Priest en Jarez (FR); Pascal Godard, Saint Georges Haute Ville (FR); Jean Paul Bincaz, Saint Bonnet de Mure (FR)

(73) Assignee: ERICO International Corporation, Solon, OH (US)

( * ) Notice: Subject to any disclaimer, the term of this patent is extended or adjusted under 35 U.S.C. 154(b) by 120 days.

(21) Appl. No.: 13/471,975

(22) Filed: May 15, 2012

(65) Prior Publication Data

US 2013/0068495 A1    Mar. 21, 2013

Related U.S. Application Data

(60) Provisional application No. 61/536,222, filed on Sep. 19, 2011.

(51) Int. Cl.
*H02G 5/00* (2006.01)
*H01R 25/14* (2006.01)

(52) U.S. Cl.
CPC .............. *H01R 25/14* (2013.01); *H02G 5/005* (2013.01)
USPC ..... 174/68.2; 174/72 B; 174/71 B; 174/70 B; 361/611; 361/648

(58) Field of Classification Search
CPC ........... H02G 5/025; H02G 5/00; H02G 5/02; H02G 5/005; H02B 1/21; H02B 1/20; H02B 1/00; H01R 13/53; H01R 25/16; H01R 25/14; H01R 31/085; H01R 9/2675; H05K 2201/10272; H05K 2203/167; H05K 5/00; H05K 7/026

USPC ...... 174/68.2, 72 B, 71 B, 99 B, 149 B, 88 B, 174/70 B, 129 B, 133 B, 260, 268; 439/212, 439/213, 114, 210, 76.1, 76.2, 949, 55, 66; 361/611, 324, 37, 639, 648, 650, 775, 361/624, 627, 637, 649, 675, 641

See application file for complete search history.

(56) References Cited

U.S. PATENT DOCUMENTS 2,376,307 A * 5/1945 Bosch ....................... 174/129 B
4,192,352 A    3/1980 Hakamada et al.
(Continued)

FOREIGN PATENT DOCUMENTS

DE    102008061671    7/2010
EP    0420784    4/1991
(Continued)

OTHER PUBLICATIONS

International Search Report and Written Opinion from corresponding International Application No. PCT/US12/38122.
European Search Report from corresponding European Application No. 12169241, mailed on Jun. 23, 2014.

*Primary Examiner* — Angel R Estrada
(74) *Attorney, Agent, or Firm* — Renner, Otto, Boisselle & Sklar, LLP

(57) ABSTRACT

A flexible busbar includes a central conductor (generally of rectangular cross section comprising multiple layers of thin aluminum, copper or other alloys with good electrical properties (conductivity)) and a sleeve having a shape on the internal surface to reduce the adhesion between the two conductors and the sleeve when the flexible busbar is bent, folded, or twisted. This increases the flexibility of the flexible busbar.

25 Claims, 4 Drawing Sheets

(56) References Cited

U.S. PATENT DOCUMENTS

| | | | |
|---|---|---|---|
| 5,274,195 A * | 12/1993 | Murphy et al. | 174/268 |
| 5,941,654 A * | 8/1999 | Chauquet | 174/88 B |
| 6,051,782 A * | 4/2000 | Wagner | 174/71 B |
| 6,677,527 B2 * | 1/2004 | Brannmark | 174/68.2 |
| 8,258,404 B2 * | 9/2012 | Latimer | 174/149 B |
| 2010/0319958 A1 | 12/2010 | Latimer | |

FOREIGN PATENT DOCUMENTS

| | | |
|---|---|---|
| FR | 1291432 | 4/1962 |
| JP | 08-050821 A | 2/1996 |
| JP | 2009-266414 A | 11/2009 |

* cited by examiner

US 8,859,897 B2

FLEXIBLE BUSBAR

This application claims priority under 35 USC 119 to U.S. Provisional Application No. 61/536,222, filed Sep. 19, 2011, which is incorporated herein by reference in its entirety.

BACKGROUND OF THE INVENTION

1. Technical Field of the Invention

The present invention relates to the technical field of bars electrically isolated and in particular the flexible bars used to carry out such connections in electrical systems.

2. Description of the Related Art

Usually, busbars come in the form of a central conductor generally rectangular cross section, which is covered by a sheath or insulation. In the case of flexible bars designed to be easily bent or twisted, they use multiple layers of thin aluminum, copper or other alloys with good electrical properties (conductivity).

In the previous flexible busbars, any of four different methods was used to provide electrical insulation to the flexible busbars. In the first method the electrical insulation of the bars (the multiple thin conductor layers) is accomplished by a sheath coating created by an extrusion process, as illustrated in FIG. 1. FIG. 1 shows a prior art busbar 10 that includes insulation 12, a PVC or halogen-free compound, or an insulating compound such as rubber, that is extruded around the central conductor 14 that usually consists of a staking of strips or laminates 16. The two largest interior surfaces of the insulation 12 are smooth and can be pressed on the center conductor 14 (stack of conductor layers 16). Maximum contact area between the central conductor 14 and the insulation 12 is possible, creating adhesion between two materials 14 and 12, and thus reducing the flexibility of the flexible bar 10. Although during the extrusion process a gap between the central conductor 14 and the insulation 12 exists, the gap will disappear and the flexibility will be reduced when the bar 10 will be bent or twisted.

In a second method, shown in FIGS. 2A and 2B, a prior art busbar 20 has its center conductor 24 insulated with flexible strips of thermoplastic 26, preferably four flexible strips of thermoplastic. The flexible strips 26 have greater dimensions than the outer dimensions corresponding to the central conductor, and are joined together by their longitudinal edges by welding or gluing. The surface of these flexible strips of thermoplastics are smooth or with a small roughness. The smooth interior (or the small roughness) of the sheath also allows maximum contact area between the sheath and the central conductor, creating an adhesion between the two parties when the flexible busbar 20 is bent, fold, or twisted, thus reducing the flexibility of the flexible bar 20. The strips 26 may include a top strip 28 and a bottom strip 30 that overlap edges of side strips 32 and 34, as is shown in FIG. 2A. Alternatively, as shown in FIG. 2B, the strips 26 may include a top strip 38 and a bottom strip 40 that have their edges overlapped by side strips 42 and 44.

Another possibility is to use a heat-shrink sleeve of insulation material, as shown in FIG. 3. The prior art busbar 50 includes a heat-shrink sleeve or sheath 52 of insulation material. The sleeve or sheath 52 has a smooth interior that allows maximum contact area between the sheath 52 and the central conductor 54, creating an adhesion between the sheath 52 and the central conductor 54. Shrink tubing 52 has the disadvantage of applying a pressure against the central conductor 54. This reduces the flexibility of the flexible bar 50.

A fourth possibility is to use a pre-extruded sleeve. The smooth interior of the sheath also allows maximum contact area between the sheath and the central conductor, creating an adhesion between the two sheath and central conductor. A pre-extruded sleeve needs to be significantly larger than the central conductor, to be able to push or pull the sleeve easily relative to the central conductor. The process of placing the sleeve onto the central conductor is mainly a manual process and is expensive.

From the forgoing it will be appreciated that improvements would be desirable with regard to flexible busbars. In particular, it would be desirable to have a busbar with improved flexibility.

SUMMARY OF THE INVENTION

A flexible busbar has an internal shape of the insulation sleeve to improve the sliding between the central conductor and the insulation material. By adding streaks or grooves to the inner surface of the insulation sleeve, the contact surface between the central conductor and the insulation material is reduced. This results in improved flexibility of the flexible busbar.

According to aspects of the invention, a flexible busbar includes: a central electrical conductor; and a flexible electrically-insulating sleeve surrounding the conductor, wherein the sleeve has an inner surface facing the conductor. The inner surface is not smooth. The busbar may have one or more of the following features: the inner surface is a textured surface; the textured surface has a patterned texture; the textured surface has an irregular (patternless) texture; the inner surface has protrusions and/or grooves; the inner surface has a roughness (Ra value as measured by DIN 4768) of at least 0.8 micrometers; <20% of the inner surface is in contact with the central conductor; the sleeve is made of a plastic material; the sleeve is made of PVC; the sleeve is made of a silicone compound; the sleeve is extruded; the sleeve is by an assembly of flexible strips; the strips are made of thermoplastic; the sleeve has reduced adhesion to the conductor, relative to prior sleeves with smooth inner surfaces; the sleeves may be formed as an assembly of flexible strips of thermoplastic having protrusions and/or grooves that decrease the contact surface; the conductor is made of a laminate of strips of conductive material; the conductor is made of copper; and/or the conductor is made of aluminum.

According to another aspect of the invention, a method of making electrical an electrical connection with a flexible busbar includes: bending or twisting the flexible busbar into shape; and after the bending or twisting, coupling the ends of the flexible bar to respective electrical conductors; wherein the bending or twisting includes sliding the central conductor of the busbar relative to the insulator sleeve of the busbar.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A flexible busbar includes a central conductor (generally of rectangular cross section comprising multiple layers of thin aluminum, copper or other alloys with good electrical properties (conductivity)) and a sleeve having a shape on the internal surface to reduce the adhesion between the two conductors and the sleeve when the flexible busbar is bent, folded, or twisted. This increases the flexibility of the flexible busbar.

The sleeve's internal surface may have protrusions and/or grooves that decrease the contact surface, and thus the adhesion, between the sleeve and the conductors. The sleeve may be formed by extrusion, with the protrusions and/or grooves created in the profile to decrease the contact surface (adhesion) between the central conductor and the sleeve, and guarantee flexibility, even after bending or folding or twisting. Alternatively, the sleeve may be formed by doing an assembly of flexible strips of thermoplastic having the internal surface with a roughness of at least 0.8 micrometers (or an irregular surface). For an irregular surface the surface may have a roughness of >10, for example having a roughness of 20. This compares with a roughness of 4 for a standard PVC sheet. As another alternative, the sleeves may be formed as an assembly of flexible strips of thermoplastic having protrusions and/or grooves that decrease the contact surface. The material having protrusions and/or grooves (or other surface features) may be but around the conductors manually and/or by machine.

The raw material of the sleeve is selected according to the level of insulation requested by the standards. The hardness of the insulation material may be less than 99 Shore A. Examples of suitable material include high resistance, self-extinguishing polyvinyl chloride (PVC) or silicone compounds. The conductive core may be formed by multiple layers of electrolytic copper, which may be plain or plated with tin. Other suitable electrically-conductive materials, such as aluminum, may be used.

Figure 1:
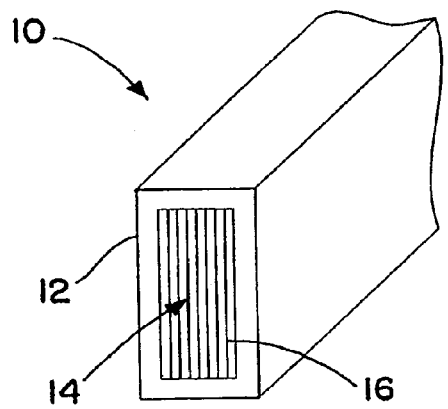
FIG. 1 is an oblique view of a first prior art flexible busbar.
Figure 4:
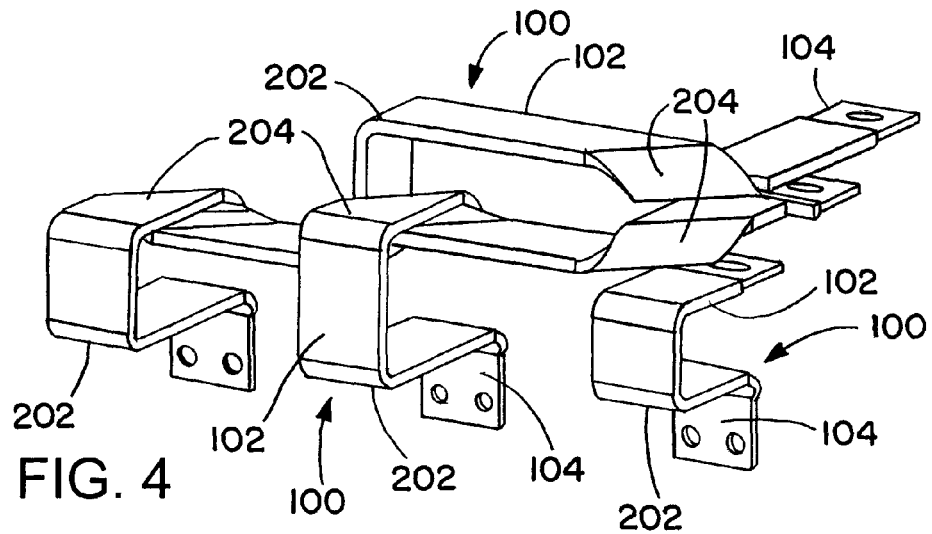
FIG. 4 is an oblique view of busbars in accordance with an embodiment of the present invention.

FIG. 4 shows examples of a flexible busbar 100 that has improved flexibility relative to prior busbars. The busbar 100 has an insulation sleeve or sheath 102 that surrounds a central electrical conductor 104. The central conductor 104 may be the same as the central conductor 14 (FIG. 1), constituting multiple strips or laminates of electrolytic copper, which may be plain or plated with tin, and/or other suitable electrically-conductive materials, such as aluminum.

Figure 5A:
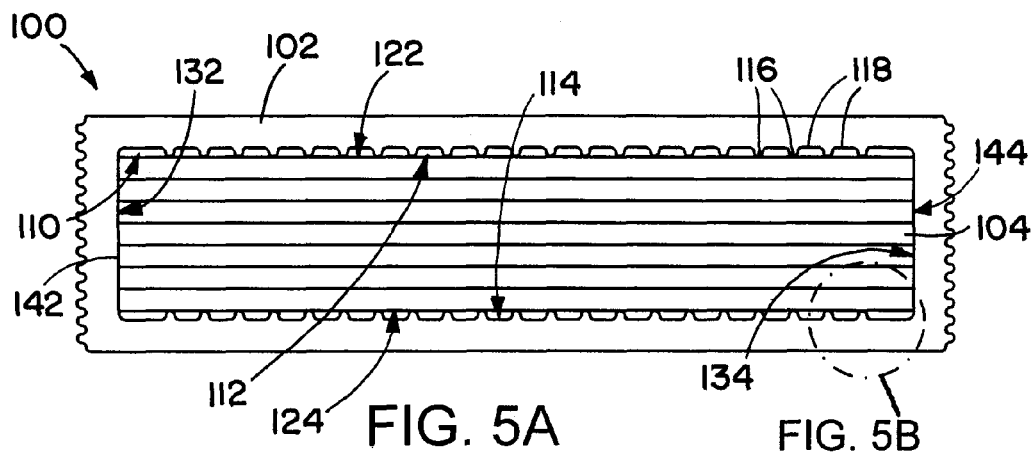
FIG. 5A is an end view of the busbar of FIG. 4.
Figure 5B:
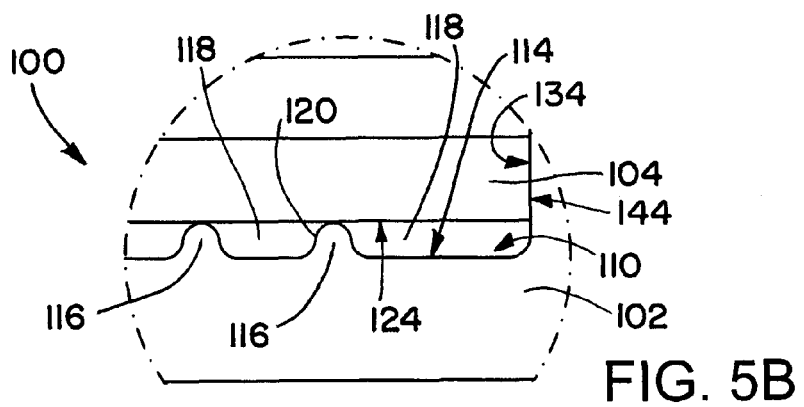
FIG. 5B is a detail view of area 5B of FIG. 5A.

With reference now to FIGS. 5A and 5B, the insulation sleeve 102 has an inner surface 110 that is non-smooth. The inner surface 110 is non-smooth in that at least part of the inner surface of the sleeve 102, facing the central conductor 104, is not smooth, although other portions of the inner surface 110 may be smooth. FIGS. 5A and 5B show an example of internal shape (in hollow or relief) to decrease the contact surface (adhesion) between the central conductor 104 and the sleeve 102. The inner surface 110 of the sleeve 102 has opposed major inner surfaces 112 and 114 that have alternating protrusions 116 and grooves 118. The protrusions 116 may have rounded ends 120 that contact major surfaces 122 and 124 of the central conductor 104. The contact areas between the sleeve major inner surfaces 112 and 114, and the conductor major surfaces 122 and 124, may be greatly reduced by the non-smooth surface on the sleeve major inner surfaces 112. Compared with a comparable smooth surface the contact between the sleeve major surface 112 and 114, and the conductor major surfaces 122 and 124, may be reduced by at least 80% (20% or less of the contact area of a comparable smooth surface), may be reduced by at least 90% (10% or less of the contact area of a comparable smooth surface), or may be reduced by at least 95% (5% or less of the contact area of a comparable smooth surface). The reduction of surface area facilitates the sliding of the conductor 104 relative to the flexible sleeve 102 as the flexible busbar 100 is bent or twisted. By allowing sliding between the conductor 104 and the sleeve 102 flexibility of the busbar 100 may be maintained, even when the busbar 100 has been subject to some bending or twisting.

The sleeve 102 has minor inner surfaces 132 and 134 that face minor surfaces 142 and 144 of the conductor 104. The sleeve minor inner surfaces 132 and 134 are opposed to one another, facing each other across the width of the conductor 104, and may be perpendicular to the sleeve major surfaces 112 and 114. In the sleeve 102 the sleeve minor inner surfaces 132 and 134 are smooth, but alternatively the sleeve minor inner surfaces can have protrusions, grooves, or some sort of non-smooth roughness. Since the conductor 104 may be composed of parallel laminates, there may be less of a concern in contact between the minor surfaces than there is for contact between the major surfaces. Alternatively, the sleeve minor inner surfaces 132 and 134 may have non-smooth surfaces.

Figure 6:
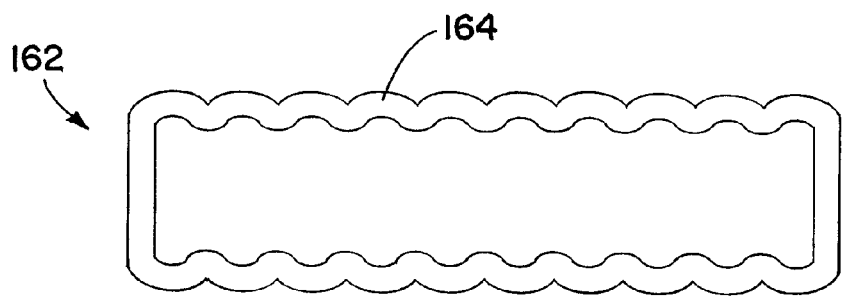
FIG. 6 is an end view of an alternate sleeve that is part of a first alternate embodiment of the present invention.
Figure 7:
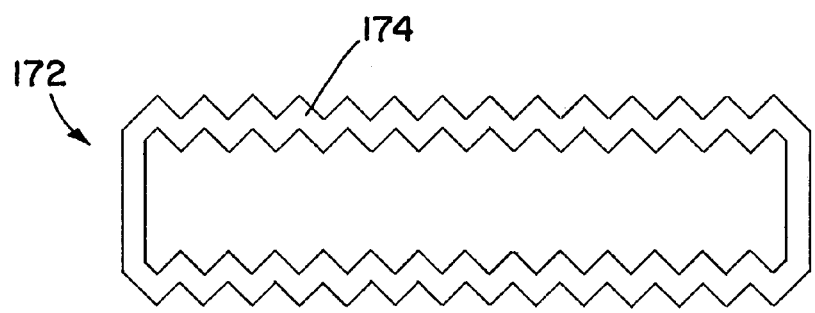
FIG. 7 is an end view of an alternate sleeve that is part of a second alternate embodiment of the present invention.

A wide variety of alternative configurations for the sleeve 102 are possible. FIGS. 6 and 7 show examples of alternative cross-section shapes for the sleeve. FIG. 6 shows a sleeve 162 that has a curved waveform shape 164 for along its major surfaces. FIG. 7 shows a sleeve 172 that has a sawtooth shape 174 along its major surfaces. These are only a few examples of the many sleeve cross-section shapes that are possible. To reduce the adhesion between the central conductor and the sleeve, the shape could be hollow or a relief, and could be linear or nonlinear.

Figure 8:
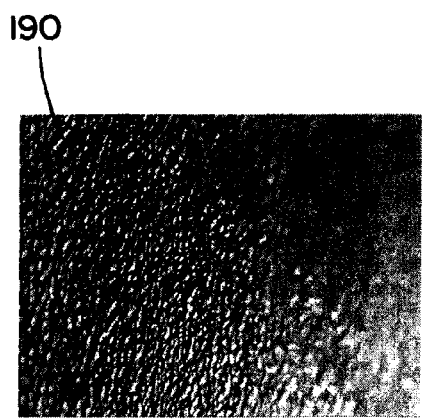
FIG. 8 is a view showing surface roughness on a sleeve inner surface of a sleeve that is part of a third alternate embodiment of the present invention.

FIG. 8 shows another alternative, in which an inside surface has a rough surface 190, such as that illustrated, in order to reduce the contact surface. The rough surface 190 may have any of a variety of patterns, or may be a patternless (irregular) surface. The rough surface 190 may be a pebbled surface, as is illustrated. The rough surface 190 may be on all or part of the inner surface of a sleeve, for example being on sleeve major inner surfaces. The surface shown may have a roughness of about 20. More broadly, the surface may have a roughness of 10 or more.

The usage of this new internal shape avoids excessive adhesion (sticking) between the sleeve and the central conductor or conductors. When sticking occurs, the bar is more rigid because the conductor cannot slide in the sleeve during deformations, such as bending, twisting, or folding of the bar. Such rigidity is a disadvantage during the use, in that it requires users to apply more power to bend, twist, or fold the flexible bars. By decreasing the contact surface between the conductor and the insulation, the sticking issue can be decreased, so the total flexibility of the flexible bar is improved, which is an advantage to the end user. This increase of flexibility is accomplished without adding any substances to the flexible bar, such as friction-reducing substances (lubricants) between the sleeve and the central conductor or conductors.

Figure 9:
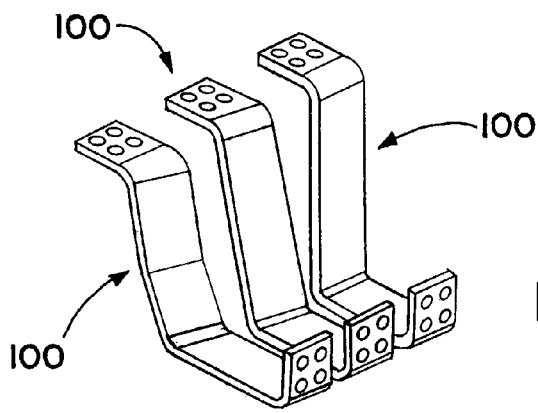
FIG. 9 is an oblique view of multiple of the busbars of the embodiment of FIG. 4, showing additional possible configurations.
Figure 10:
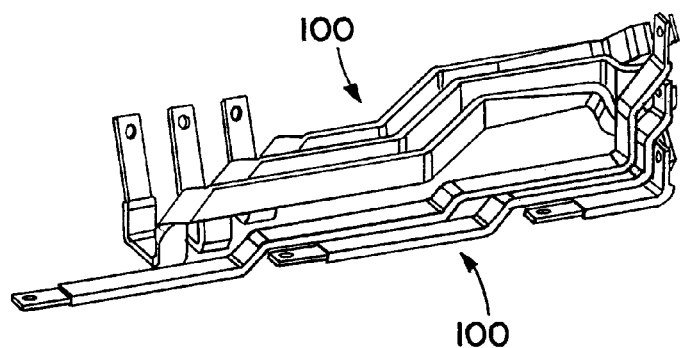
FIG. 10 is an oblique view of multiple of the busbars of the embodiment of FIG. 4, showing further possible configurations.
Figure 11:
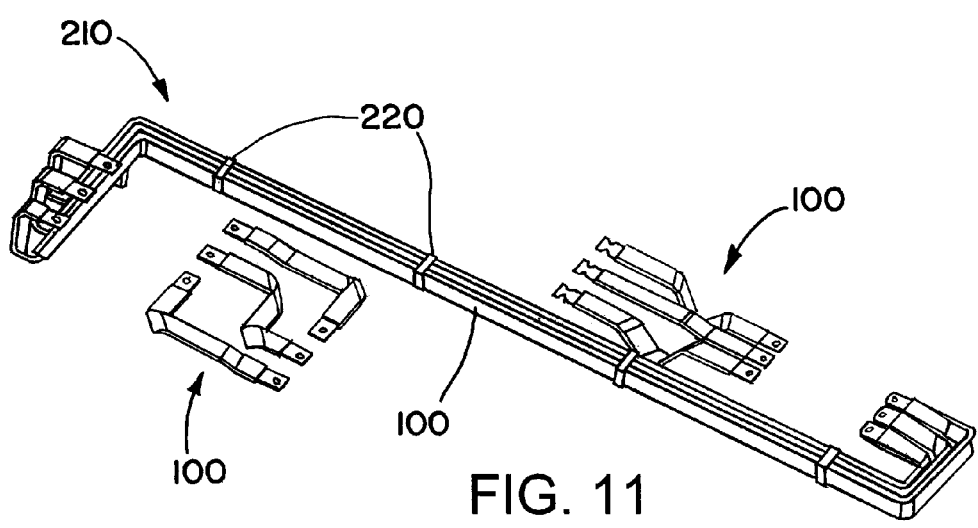
FIG. 11 is an oblique view of multiple of the busbars of the embodiment of FIG. 4, showing still further possible configurations.

FIGS. 4 and 9-11 show examples of deformations that may be achieved with busbars, for example the busbar 100, of the present invention. FIG. 4 shows various examples of busbars 100 with various bends 202 and twists 204 in them. FIG. 9 also shows busbars 100 with bends 202 in them. FIG. 10 shows more examples of busbars 100 with bends and twists. FIG. 11 shows further examples of busbars 100 with bends and/or twists. FIG. 11 shows a group 210 of busbars 100 linked together with ties 220. The busbars 100 shown in FIGS. 4 and 9-11 may be cut to length, have their insulation stripped, bent, and twisted using various known suitable tools (not shown) that are available from ERICO International Corporation of Solon, Ohio, USA.

Figure 2A:
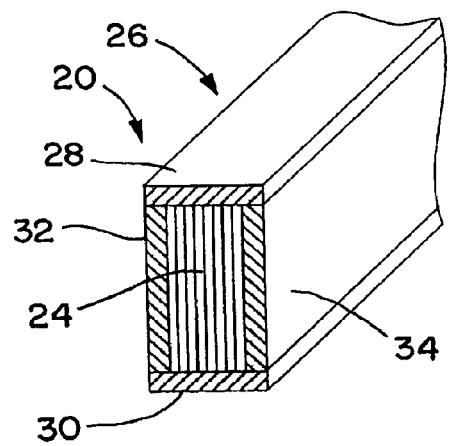
FIG. 2A is an oblique view of a second prior art busbar.
Figure 2B:
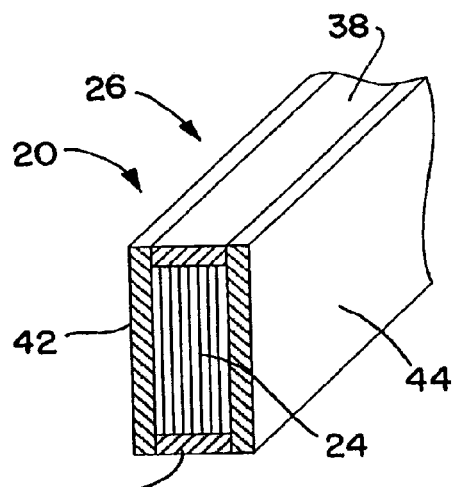
FIG. 2B is an oblique view of a third prior art busbar.
Figure 3:
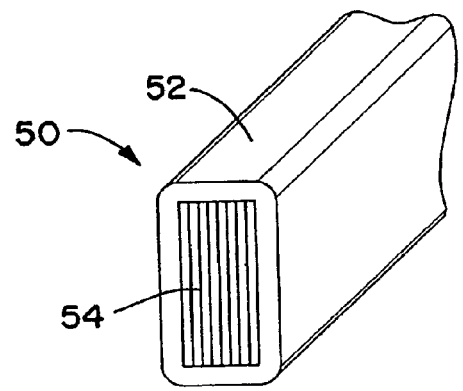
FIG. 3 is an oblique view of a fourth prior art busbar.

The various insulation sleeves described above for use with busbars, such as the busbar 100, may be formed as a single piece, such as by extrusion, or as multiple pieces. A sleeve with multiple pieces may be formed by doing an assembly of flexible strips of thermoplastic, similar to those prior art sleeves shown in FIGS. 2A and 2B.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flexible busbar comprising:
    a central electrical conductor; and
    a flexible electrically-insulating sleeve surrounding the conductor, wherein the sleeve has an inner surface facing the conductor;
    wherein the inner surface is not smooth; and
    wherein the inner surface has a textured surface with a series of protrusions in contact with the conductor, with adjacent of the protrusions separated by grooves therebetween, wherein the protrusions are oriented in a longitudinal direction along a length of the busbar.

2. The flexible busbar of claim 1, wherein the inner surface has a roughness of at least 0.8 micrometers.

3. The flexible busbar of claim 1, wherein less than 20% of the inner surface is in contact with the central conductor.

4. The flexible busbar of claim 1,
    wherein the inner surface include a pair of opposed major inner surfaces in contact with major surfaces of the central conductor, and a pair of opposed minor inner surfaces in contact with minor surfaces of the conductor;
    wherein the protrusions and the grooves are on the major inner surfaces.

5. The flexible busbar of claim 4, wherein the minor inner surfaces are smooth surfaces.

6. The flexible busbar of claim 4, wherein the textured surface is on the major inner surfaces of the busbar for the length of the busbar.

7. The flexible busbar of claim 1, wherein the sleeve is made of a plastic material.

8. The flexible busbar of claim 7, the sleeve is made of polyvinyl chloride (PVC).

9. The flexible busbar of claim 1, wherein the sleeve is made of a silicone compound.

10. The flexible busbar of claim 1, wherein the sleeve is extruded.

11. The flexible busbar of claim 1, wherein the sleeve is an assembly of flexible sleeve strips.

12. The flexible busbar of claim 11, wherein the sleeve strips are made of thermoplastic.

13. The flexible busbar of claim 1, wherein the conductor slides relative to the flexible sleeve when the flexible busbar is bent or twisted.

14. The flexible busbar of claim 1, wherein the conductor is made of a laminate of strips of conductive material.

15. The flexible busbar of claim 1, wherein the conductor is made of copper.

16. The flexible busbar of claim 1, wherein the conductor is made of aluminum.

17. The flexible busbar of claim 1, wherein the protrusions have widths that are less than widths of the grooves.

18. The flexible busbar of claim 1, wherein the texture surface facilitates sliding of the central electrical conductor relative to the sleeve, in the longitudinal direction.

19. A flexible busbar comprising:
    a central electrical conductor having opposed major surfaces and opposed minor surfaces; and
    a flexible electrically-insulating sleeve surrounding the conductor, wherein the sleeve has an inner surface facing the conductor;
    wherein an inner surface portion facing the opposed major surfaces has a series of protrusions in contact with the conductor, with adjacent of the protrusions separated by grooves therebetween, wherein the protrusions are oriented in a longitudinal direction.

20. The flexible busbar of claim 19, wherein the protrusions are parallel to one another.

21. The flexible busbar of claim 19, wherein the protrusions are equally spaced along a width of the sleeve.

22. The flexible busbar of claim 19, wherein 80% or more of the area of the major surfaces that is covered by the sleeve is not in contact with the sleeve.

23. The flexible busbar of claim 19, wherein an inner surface portion facing the minor inner surfaces is smooth.

24. The flexible busbar of claim 19, wherein the protrusions have widths that are less than widths of the grooves.

25. A flexible busbar comprising:
    a central electrical conductor; and
    a flexible electrically-insulating sleeve surrounding the conductor, wherein the sleeve has an inner surface facing the conductor;
    wherein the inner surface is not smooth;
    wherein the inner surface is a textured surface; and
    wherein the textured surface has an irregular (patternless) texture.

* * * * *